United States Patent
Seurat Guiochet et al.

(10) Patent No.: US 7,523,696 B2
(45) Date of Patent: *Apr. 28, 2009

(54) PRESSURE-COOKING APPLIANCE INCLUDING OPENING SAFETY MEANS

(75) Inventors: Claire Marie-Aurore Seurat Guiochet, Dijon (FR); Daniel Jean-Marie Anota, Dijon (FR); Eric Chameroy, Veronnes (FR)

(73) Assignee: SEB S.A., Ecully (FR)

( * ) Notice: Subject to any disclaimer, the term of this patent is extended or adjusted under 35 U.S.C. 154(b) by 452 days.

This patent is subject to a terminal disclaimer.

(21) Appl. No.: 10/998,322

(22) Filed: Nov. 26, 2004

(65) Prior Publication Data

US 2005/0132896 A1    Jun. 23, 2005

(30) Foreign Application Priority Data

Nov. 27, 2003   (FR) .................................. 03 13939

(51) Int. Cl.
*A47J 37/00* (2006.01)
(52) U.S. Cl. ........................ 99/337; 99/403; 219/440; 220/316; 220/573.1; 220/912
(58) Field of Classification Search .............. 99/337, 99/403; 219/440; 220/912, 573.1, 293, 315, 220/316
See application file for complete search history.

(56) References Cited

U.S. PATENT DOCUMENTS 4,313,371 A * 2/1982 Jackson et al. ............... 99/337
4,711,366 A * 12/1987 Chen .......................... 220/316
6,425,320 B1   7/2002 Chameroy et al. ............. 99/337
7,322,280 B2 * 1/2008 Seurat Guiochet et al. ..... 99/337

FOREIGN PATENT DOCUMENTS

| DE | 44 45 672 A | 12/1994 |
| EP | 1 342 440 A | 3/2003 |
| FR | 2 816 491 A | 11/2000 |

* cited by examiner

*Primary Examiner*—Reginald L Alexander
(74) *Attorney, Agent, or Firm*—Thomas, Kayden, Horstemeyer, & Risley, LLP (57) ABSTRACT

The invention relates to an appliance for cooking under pressure, the appliance comprising:
  a bowl and a lid; and
  opening safety means suitable for going between a neutral position, in which they allow the lid to be unlocked, and a blocking position, in which they prevent the lid from being unlocked, said safety means being designed to find themselves in the blocking position when the pressure prevailing inside the vessel is greater than or equal to a predetermined value or "rise pressure", and/or when the temperature prevailing inside the vessel is greater than or equal to a predetermined value or "rise temperature";

said appliance being further comprising actuating means for actuating the safety means, which actuating means are arranged to make it possible to place the safety means in the blocking position. The invention is applicable to household appliances for cooking under pressure.

23 Claims, 3 Drawing Sheets

PRESSURE-COOKING APPLIANCE INCLUDING OPENING SAFETY MEANS

CROSS-REFERENCE TO RELATED APPLICATION

This application claims priority to copending French Patent Application entitled, "A Pressure-Cooking Appliance Including Opening Safety Means," having Application No. FR-03 13939, filed on Nov. 27, 2003, which is entirely incorporated herein by reference.

The present invention relates to the general technical field of household appliances for cooking under pressure, such an appliance comprising a bowl and a lid designed to be locked onto the bowl to form a leaktight cooking vessel. Such an appliance serves to cook food contained in the bowl under steam pressure.

The present invention relates more particularly to a household appliance for cooking food under pressure, the appliance comprising:

a bowl and a lid designed to be mounted on and locked onto said bowl to form a leaktight cooking vessel; and opening safety means suitable for going between a neutral position, in which they allow the lid to be unlocked, and a blocking position, in which they prevent the lid from being unlocked, said safety means being designed to find themselves in the blocking position when the pressure prevailing inside the vessel is greater than or equal to a predetermined value or "rise pressure", and/or when the temperature prevailing inside the vessel is greater than or equal to a predetermined value or "rise temperature".

BACKGROUND OF THE INVENTION

Pressure-cooking appliances of the pressure cooker type are already known that are provided with opening safety means. Such opening safety means are well known per se. They make it possible for positive opening safety to be provided by allowing the lid of the appliance to be released relative to the bowl only when the pressure level prevailing inside the vessel reaches a level acceptable from the point of view of user safety, i.e. a pressure level that is low enough to avoid any sudden expulsion of the lid or any spraying of scalding-hot cooking substances.

Such known opening safety means are generally constituted by a pressure-gauge rod that is sensitive to the pressure prevailing inside the cooking vessel, and that is mounted to move between a low position in which it allows the lid to be unlocked, and a high position, in which it co-operates with the locking/unlocking means for locking/unlocking the lid in a manner such as to prevent said means from going from the locking position to the unlocking position.

In such known appliances, the pressure-gauge rod moves upwards and downwards automatically and as a function of the pressure prevailing inside the cooking vessel only. The pressure-gauge rod in such a prior art appliance also has a weight/size compromise calculated to be favorable to the rod moving upwards into its high position early, e.g. as soon as the pressure inside the pressure cooker reaches or exceeds 0.5 kilopascals (kPa).

Early upward movement of the rod is desirable in order to enable the pressure to increase as quickly as possible, which is not possible so long as the pressure-gauge rod is in the low position, which is a non-leaktight position.

Unfortunately, even when the rod is ideally shaped and dimensioned to be favorable to said rod rising into its high position early, it is observed, in practice, that it is generally necessary to subject the appliance to a heat source having high power in order to ensure that the rod does indeed rise "early".

In addition, if the weight/size compromise of the known pressure-gauge rods is chosen to be favorable to early rising of the rod, the same compromise is unfavorable to the rod moving downwards from its high position to its low position. In practice, it is observed that, in particular due to the very small weight of the rod, which weight is chosen to be favorable to the rod rising, the rod moving downwards is often random, and, in any event, takes place at a pressure that is generally considerably lower than the pressure that caused it to rise.

Therefore, the user must generally wait for a relatively long time between the moment at which the user triggers decompression of the appliance, and the moment at which the user can actually separate the lid from the bowl, in order to access the food.

Such a relatively long time also prevents a pressure cooker from being used as a conventional cooking pot, with which the user can very easily and quickly open and close the lid at will during cooking, for the purposes of inspecting the food directly, of seasoning it, or of tasting it, for example.

The opening safety means equipping known cooking means thus considerably slow down the overall time of the cooking cycle, by requiring a latency time at the beginning and at the end of cooking.

OBJECTS AND SUMMARY OF THE INVENTION

Objects assigned to the invention are therefore to remedy the various above-listed drawbacks, and to propose a novel household appliance for cooking food under pressure that enables the rapidity of the cooking cycle to be improved, while also being particularly safe for the user to use.

Another object of the invention is to propose a novel household appliance for cooking food under pressure that is of particularly simple and inexpensive design.

Another object of the invention is to propose a novel household appliance for cooking food under pressure that makes it possible for the cooking cycle time to be optimized.

Another object of the invention is to propose a novel household appliance for cooking food under pressure that offers an excellent compromise in terms of cooking speed, ease of use, and safety.

The objects assigned to the invention are achieved by means of an appliance for cooking food under pressure, the appliance comprising:

a bowl and a lid designed to be mounted on and locked onto said bowl to form a leaktight cooking vessel; and opening safety means suitable for going between a neutral position, in which they allow the lid to be unlocked, and a blocking position, in which they prevent the lid from being unlocked, said safety means being designed to find themselves in the blocking position when the pressure prevailing inside the vessel is greater than or equal to a predetermined value or "rise pressure", and/or when the temperature prevailing inside the vessel is greater than or equal to a predetermined value or "rise temperature";

said appliance further comprising actuating means for actuating the safety means, which actuating means are arranged to make it possible to place the safety means in the blocking position regardless of the pressure level prevailing inside the cooking vessel.

BRIEF DESCRIPTION OF THE DRAWINGS

Other features and advantages of the invention appear in greater detail on reading the following description with reference to the accompanying drawings which are given by way of non-limiting illustrative example, and in which.

MORE DETAILED DESCRIPTION

The cooking appliance of the invention is designed to cook various types of food under pressure in a household context.

Preferably, the cooking appliance of the invention is a pressure cooker.

Figure 1:
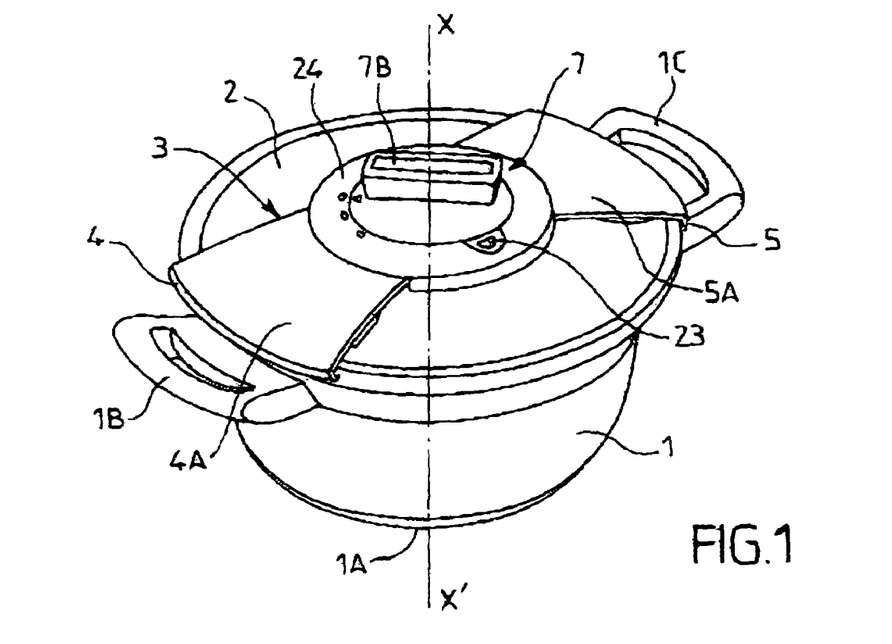
FIG. 1 is an overall perspective view of a household cooking appliance of the invention.

Conventionally, the cooking appliance of the invention includes a bowl 1 forming a cooking receptacle and preferably being circularly symmetrical about an axis X-X' (cf. FIG. 1)

Below, the adjective "axial" refers to the direction of said axis of symmetry X-X' which is substantially the same as the vertical direction when the appliance is operating normally.

In conventional manner, the bowl 1 is manufactured from a metal material such as stainless steel, and it is provided with a heat-conducting bottom 1A secured to the bowl, e.g. by hot stamping.

The bowl 1 is preferably of circular section, the diameter of its opening being, for example, about 26 centimeters (cm), which corresponds to the standard applicable to stewpots.

The bowl 1 can also be provided with members for picking it up such as handles 1B, 1C of which there are preferably two, and which are fixed to the bowl in diametrically opposite manner, for example (cf. FIG. 1).

The appliance of the invention also includes a lid 2 designed to be mounted on and locked onto said bowl 1 to form a cooking vessel that is substantially leaktight, i.e. sufficiently airtight to enable the pressure in the appliance to be increased.

Figure 2:
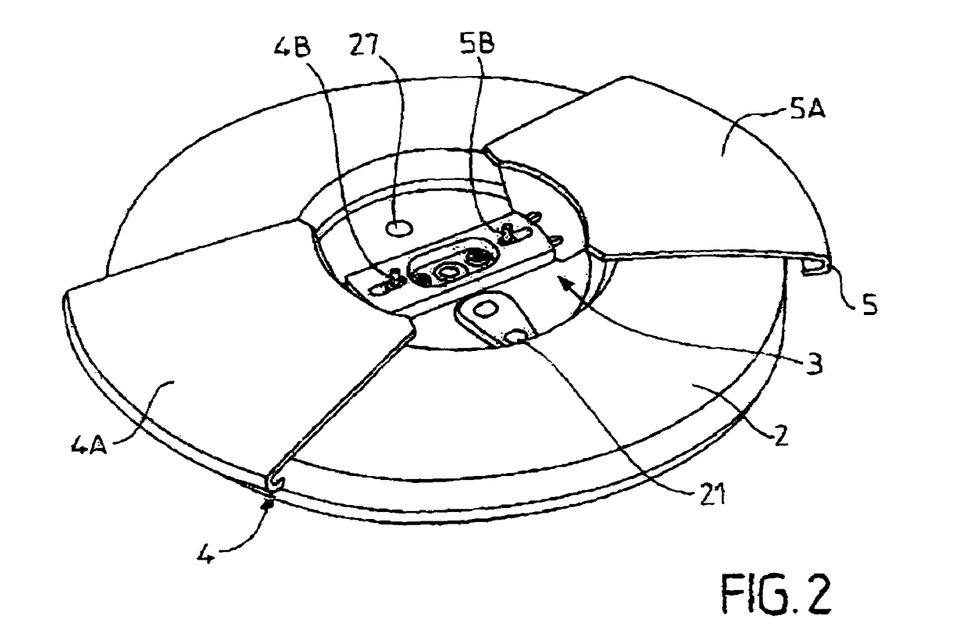
FIG. 2 is a perspective view of a detail of an embodiment of the locking/unlocking means of the lid of a cooking appliance of the invention.
Figure 3:
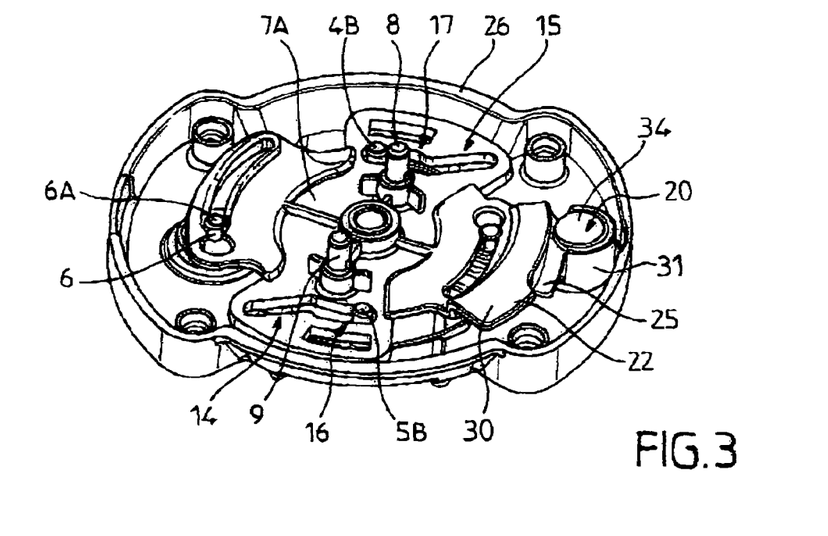
FIG. 3 is a perspective view of a detail of an embodiment of a cooking appliance of the invention.
Figure 4:
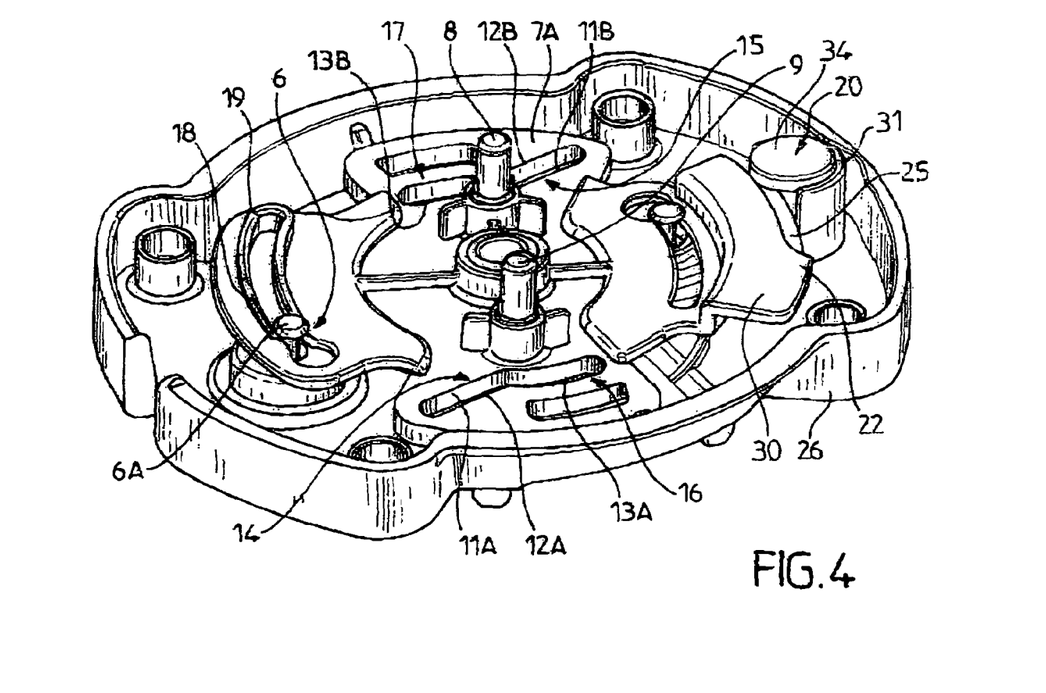
FIG. 4 is another perspective view showing the embodiment detail shown in FIG. 3.

The lid 2 is advantageously substantially disk-shaped and can be locked onto or unlocked from the bowl 1 by locking/unlocking means 3 for locking/unlocking the lid 2 relative to the bowl 1 (shown in particular in FIG. 2).

The locking/unlocking means 3 may be of any type known to the person skilled in the art, and they are conventionally suitable for going between a locking position for locking the lid 2 relative to the bowl 1 and in which the lid is secured to the bowl, and an unlocking position for unlocking the lid 2 relative to the bowl 1, and in which the lid can be separated from the bowl.

The locking/unlocking means 3 can be of any type known to the person skilled in the art. They are advantageously constituted by a device having jaws.

The locking/unlocking means 3 are however not limited to a jaw system, and can, for example, be based on any other known locking principle, e.g. a principle using bayonet locking fittings, segment locking fittings, locking bars or any other means well known to the person skilled in the art, without going beyond the ambit of the invention.

Advantageously, the locking/unlocking means 3 of the appliance of the invention comprise at least one locking element 4, 5 for locking the lid 2 relative to the bowl 1, said at least one locking element 4, 5 being mounted to move substantially in radial translation relative to the lid 2 via corresponding drive means 4A, 5A between the locking position and the unlocking position.

Advantageously, said at least one locking element 4, 5 comprises a jaw designed to clamp together the peripheral edges of the bowl 2 and of the lid 1.

Said jaw can be in the form of a metal plate that has a U-shaped profile at its outer end, as is well known to the person skilled in the art.

Preferably, the appliance of the invention includes two locking elements, constituted by jaws 4, 5, said jaws being positioned diametrically opposite each other about the general axis of symmetry X-X' of the appliance (cf. FIGS. 1 and 2).

Advantageously, the drive means 4A, 5A for driving each jaw 4, 5 can consist in a corresponding drive arm, it being possible, for example, for each drive arm to be formed integrally with the corresponding jaw 4, 5, as is shown in FIGS. 1 and 2.

The locking/unlocking means 3 for locking/unlocking the lid 2 relative to the bowl are however not limited to a system having jaws and it can, for example, be based on a locking principle using segments.

Advantageously, the household cooking appliance of the invention includes pressure-regulating means 6 mounted in leaktight communication with a hole 27 provided in the lid 2, and arranged to maintain the relative pressure (i.e. the measured pressure relative to atmospheric pressure) prevailing inside the vessel at a predetermined and substantially constant value referred to as the "operating pressure".

The general operating pressure of such pressure-regulating means 6 is well known to the person skilled in the art.

Thus, conventionally, the pressure-regulating means 6 comprise a pressure-regulating valve sensitive to pressure prevailing inside the vessel. Said pressure-regulating valve is mounted to move at least between:

a resilient return and abutment position or "leaktight" position in which it shuts off communication between the vessel and the outside so long as the pressure prevailing inside the vessel is substantially no higher than the operating pressure; and at least one leakage position in which it puts the inside of the vessel into communication with the outside whenever the pressure inside the vessel exceeds the operating pressure.

Conventionally, the pressure-regulating valve can have a plurality of leakage positions, including an extreme leakage position which is an abutment position, the distance between the resilient return position and the extreme leakage position constituting the maximum stroke of the pressure-regulating valve.

Such a pressure-regulating valve thus aims to maintain the pressure in the vessel in the vicinity of a predetermined nominal level once the appliance has moved on from its transient pressure-increasing state and has reached its operating steady state.

The pressure-regulating means 6 can conventionally be constituted by a valve loaded by a weight or by a compression spring and mounted to move in a well between a leaktight low position and one or more leakage high positions.

As is well known to the person skilled in the art, the pressure-regulating means 6 can also be provided with a calibration system enabling the user to select a predetermined cooking pressure from a range of a plurality of operating pressure levels as a function, for example, of the type of food present in the pressure cooker.

Advantageously, the pressure-regulating means 6 are designed so that the operating pressure lies substantially in the range 10 kPa to 30 kPa, and is preferably substantially equal to 20 kPa.

The applicant has established that selecting an operating pressure in the range 10 kPa to 30 kPa makes it possible to achieve an excellent compromise between firstly the cooking time and secondly the appliance decompression time when it is desired to go from the operating pressure to a lower pressure that is compatible with opening the lid under acceptable conditions for user safety.

However, the invention is not limited to a particular operating pressure level, and it can be implemented regardless of the operating pressure level.

In the invention, the household cooking appliance also includes activatable/deactivatable decompression means arranged so that, when they are activated, they allow the pressure prevailing inside the vessel to drop for the purpose of enabling the lid to be opened subsequently, i.e. of causing the locking/unlocking means to go from their locking position to their unlocking position.

To this end, the decompression means are activatable regardless of the pressure level prevailing inside the vessel, and in particular they are activatable when said pressure level corresponds to the operating pressure of the cooking appliance of the invention.

The functions of the decompression means are, in particular, as follows:
when the decompression means are deactivated, said decompression means allow substantially no leakage of steam from the inside of the vessel to the outside; and
when the decompression means are activated, they put the inside of the vessel into communication with the outside in order to generate a reduction in the pressure prevailing inside the vessel, said pressure going from a first value corresponding to the operating pressure to a lower second value that is compatible with unlocking the lid under safety conditions acceptable for the user.

The decompression means can consist of any conventional means known to the person skilled in the art.

The decompression means are in particular shaped and dimensioned in a manner such as to enable decompression to take place without any scalding-hot cooking substances (food or cooking liquids) being sprayed dangerously to the outside.

In the invention, the household cooking appliance includes opening safety means 20 suitable for going between a neutral position (shown in FIGS. 9 and 11), in which they allow the lid 2 to be unlocked relative to the bowl 1, and a blocking position (shown in FIGS. 3 to 5, and 7), in which they prevent the lid 2 from being unlocked relative to the bowl 1, said means being designed to find themselves in the blocking position when the pressure prevailing inside the vessel is greater than or equal to a predetermined value or "rise pressure", and/or when the temperature prevailing inside the vessel is greater than or equal to a predetermined value or "rise temperature".

The general principle of such opening safety means is well known. It makes it possible for positive opening safety to be provided by allowing the lid 2 to be unlocked relative to the bowl 1 only when the pressure level prevailing inside the vessel reaches a level that is acceptable from the point of view of user safety, and/or when the temperature prevailing inside the vessel reaches a level that is acceptable from the point of view of user safety.

Preferably, the opening safety means 20 are sensitive to the pressure prevailing inside the vessel, it being understood that, alternatively or in addition, the opening safety means could also be sensitive to some other physical parameter that can be related to user safety, such as, for example, temperature.

The safety means thus advantageously comprise a pressure-gauge rod 20 mounted facing a hole 21 provided in the lid 2 to move between a return low position (to which it is returned under its own weight, for example) forming a neutral position and a high position that it reaches automatically when the pressure in the vessel reaches the rise pressure, said high position forming the blocking position.

Advantageously, the safety means 20 are designed to interact with the locking/unlocking means 3 so as to prevent the locking/unlocking means 3 from going from their locking position to their unlocking position when said safety means 20 are in the blocking position.

The co-operation between the safety means 20 and the locking/unlocking means 3 can be direct, i.e. the safety means 20 can act directly on one or more of the parts forming the locking/unlocking means 3 in order to prevent them from moving.

Said co-operation can also be indirect, the safety means 20 then acting on the locking means via an intermediate interface part, as in the variant embodiment shown in the figures.

By way of example, it is thus possible to make provision for the safety means 20 to prevent the drive arms 4A, 5A from moving in radial translation when they are in the blocking position.

According to an important characteristic of the cooking appliance of the invention, said appliance includes actuating means 25 for actuating the safety means 20, said actuating means 25 preferably being of the activatable/deactivatable type, and being arranged so that, when they are activated, they place the safety means 20 in the blocking position regardless of the pressure level prevailing inside the cooking vessel, and in particular even when the pressure level prevailing inside the cooking vessel is lower than the rise pressure.

By means of this provision, instead of waiting, as in the prior art, for the pressure to act by increasing in the vessel to cause the safety means 20 to go over to the blocking position, it is possible to cause positively the safety means 20 to go from their neutral position to their blocking position even when the pressure inside the vessel is very low, as it is at the beginning of cooking, for example.

The actuating means 20 thus make it possible to save time during the cooking cycle because, instead of waiting for the opening safety means 20 to go by themselves into the blocking position under the effect of the appliance being brought up to pressure, the user can, by activating the actuating means directly or indirectly, manually or otherwise, place the safety means 20 in the blocking position.

The mode of action whereby the actuating means 25 act on the safety means 20 can be of any type, and in particular mechanical, magnetic, or chemical.

Preferably, the actuating means 25 are arranged to co-operate by mechanical contact with the safety means 20.

In other words, when they are activated, the actuating means come directly or indirectly into contact with the safety means 20 so as to exert a displacement force thereon tending to cause the safety means 20 to go to their blocking position. The actuating means thus drive the safety means 20 mechanically.

Preferably, the actuating means 25 are of non-reciprocal type, i.e. deactivating them does not make it possible systematically to place the safety means in the neutral position.

In particular, if, between the time at which the actuating means are activated in order to place the safety means in the blocking position and the time at which the actuating means are deactivated, the pressure prevailing inside the vessel reaches or exceeds the rise pressure, deactivating the actuating means does not lead to the safety means 20 returning to the neutral position, said safety means being held in the blocking position under the effect of the pressure.

The safety means return to the neutral position only if the pressure level remains lower than the rise pressure.

Advantageously, the opening safety means 20 are designed so that the rise pressure lies substantially in the range 1.5 kPa to 4 kPa.

Even more preferably, the safety means 20 are designed so that the rise pressure is substantially equal to 3 kPa±0.5 kPa.

Even more advantageously, the rise pressure is substantially equal to 3.3 kPa.

Advantageously, the opening safety means 20 are designed to move downwards towards their neutral position when the pressure inside the vessel reaches a relative value or "descent pressure" that lies substantially in the range 1.5 kPa to 4 kPa. Said descent pressure is generally significantly lower than the rise pressure.

Preferably, the descent pressure is substantially equal to 2.5 kPa±0.5 kPa.

In generally, in the context of the invention, provision is made for the safety means 20 to be dimensioned and shaped so that the descent pressure is as close as possible to the rise pressure even though said descent pressure remains generally lower than the rise pressure.

The opening safety means 20 are also designed so that their descent pressure is as high as possible within the limits of applicable standards.

By choosing a descent pressure that is high, such as 2.5 kPa, it is possible for the lid 2 to be opened more quickly and with greater precision over time, in particular compared with prior art pressure cookers in which the descent pressure generally does not exceed 0.5 kPa.

However, obtaining such a descent pressure generally makes the safety means 20 heavier, which is prejudicial to the speed with which the safety means 20 move up into their blocking position at the beginning of the cooking cycle.

By way of example, the mass of the safety means can lie in the range 4 grams (g) to 20 g, and preferably in the range 5 g to 9 g.

Even more preferably, the mass of the safety means is equal to 7.8 g.

However, the invention makes it possible to overcome this problem by using the actuating means 25 which make it possible to propel the safety means 20 positively into the blocking position, even if the pressure level prevailing inside the vessel is lower than the rise pressure.

Advantageously, the actuating means 25, the locking/unlocking means 3, and the decompression means 6 co-operate directly or indirectly so that, when the locking/unlocking means 3 are in the locking position, the decompression means going from their activated position to their deactivated position causes the safety means 20 to go into their blocking position.

Figure 7:
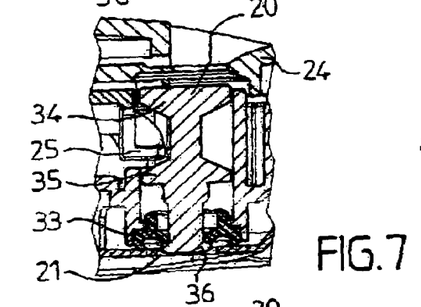
FIG. 7 is a fragmentary cross-section view of the detail of the embodiment shown in FIG. 5, when the user proceeds to decompress the appliance.
Figure 8:
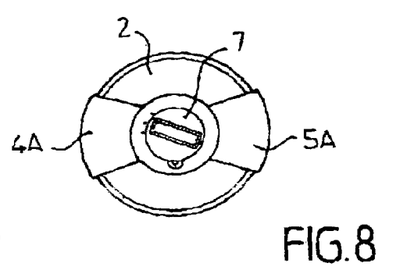
FIG. 8 is a plan view of the cooking appliance of the invention, a detail of which is shown in FIG. 7.

Advantageously, said actuating means 25, said locking/unlocking means 3, and said decompression means 6 co-operate so that, when the locking/unlocking means 3 are in their locking position and when the decompression means 6 are activated, the actuating means allow the safety means 20 to go towards their neutral position, at least if the pressure inside the vessel so permits (cf. FIGS. 7 and 8).

Preferably, the safety means 20 shut off in substantially leaktight manner the communication between the vessel and the outside when they are in the neutral position.

Advantageously, the safety means 20 also shut off in substantially leaktight manner the communication between the vessel and the outside when they are in the blocking position.

It also possible to imagine that, while they are going from one of their positions (neutral position or blocking position) to the other, the safety means open up, even to a minimum extent, the communication between the vessel and the outside. In other words, leaktightness at the safety means 20 is not guaranteed when said means are in the process of going between the two abutment positions, namely the neutral position and the blocking position.

The preferred variant embodiment shown in the figures is described in more detail below.

In this variant, the locking/unlocking means 3 and the decompression means are connected functionally to a single, common control member 7, said control member 7 being designed to be suitable for finding itself in a predetermined locking and decompression position in which said control member 7 co-operates with the locking/unlocking means 3 and with the decompression means so that the locking/unlocking means 3 find themselves in their locking position, while the decompression means are activated.

In other words, the locking/unlocking means, the decompression means, and the single control member 7 are arranged to co-operate so that, by manipulating the single control member 7, the user can cause decompression to be activated while also retaining full locking of the appliance.

Advantageously, the single control member 7 is also designed to be suitable for finding itself in a preferably predetermined unlocking and decompression position in which said control member 7 co-operates with the locking/unlocking means 3 and with the decompression means so that the locking/unlocking means find themselves in their unlocking position, while the decompression means are activated.

This locking and decompression position makes it possible for the bowl 1 to be separated totally from the lid 2.

Advantageously, the single control member 7 is also designed to be suitable for finding itself in a preferably predetermined substantially leaktight locking position, in which the control member 7 co-operates with the locking/unlocking means 3 and with the decompression means in a manner such that the locking/unlocking means 3 find themselves in their locking position, while the decompression means 6 are deactivated.

This substantially leaktight locking position corresponds to the configuration of the appliance that enables cooking to take place.

Figure 5:
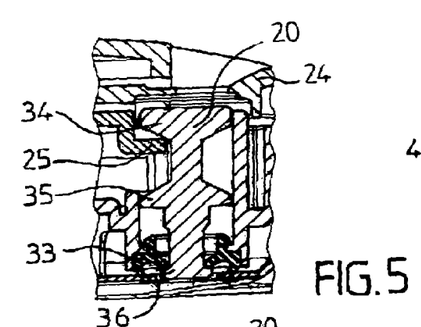
FIG. 5 is a fragmentary cross-section view of a detail of an embodiment of the opening safety means of a cooking appliance of the invention, when the user has just proceeded to lock the lid relative to the bowl in leaktight manner.
Figure 6:
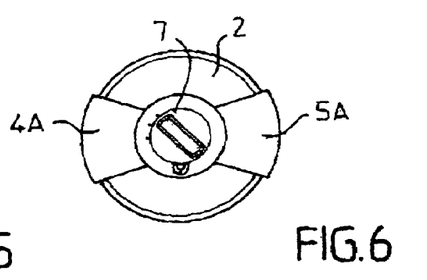
FIG. 6 is a plan view of the cooking appliance of the invention, a detail of which is shown in FIG. 5.

Thus, the control member 7 can advantageously go between the three following predetermined positions:
- an unlocking and decompression position (a) (shown in FIGS. 11 and 12);
- a locking and decompression position (b) (shown in FIGS. 7 to 10); and
- a substantially leaktight locking position (c) (shown in FIGS. 5 and 6).

Preferably, the control member 7 has a sequential nature, i.e. it is designed to allow the following position changes only:
- going from position (a) to position (b);
- going from position (b) to position (c);
- going from position (c) to position (b); and
- going from position (b) to position (a).

In particular, going directly from position (c) to position (a), without a prior safe decompression phase (position b), is prevented.

Advantageously, the control member 7 is mounted to turn relative to the lid, preferably about the axis X-X'.

The control member 7 preferably comprises a rotary intermediate plate 7A which is moved in rotation by control means 7B of the handle type that can be actuated manually by the user.

The handle 7B is preferably directly fixed to the intermediate plate 7A via fixing pins 8, 9 so as to achieve mechanical interfitting between the handle 7B and the intermediate plate 7A, which results in preventing any relative angular displacement between the handle 7B and the plate 7A (direct drive).

However, it is entirely imaginable, without going beyond the ambit of the invention, to provide a mechanical interface (not shown), e.g. a gearing-down or gearing-up mechanical interface, between the handle 7B and the intermediate plate 7A.

As shown in the figures, the rotary plate 7A can advantageously be mounted in a seat 26 itself designed to be mounted on the lid 2. The seat 26, is also designed to co-operate with a top casing 24 that peripherally caps the plate 7A (cf. FIG. 1).

The association of the casing 24 and of the seat 26 thus forms a single one-piece housing enclosing the intermediate plate 7A. Said housing can preferably be removable, i.e. it can be mounted on or removed from the lid 2 at will, with a view to washing the lid 2 in a dish washer, for example.

The control member 7 is connected functionally to the drive means 4A, 5A corresponding to each jaw 4, 5 so as to govern the movement of said drive means 4A, 5A, which, as mentioned above, are advantageously constituted by a drive arm 4A, 5A formed integrally with the corresponding jaw 4, 5.

Preferably, each drive arm 4A, 5A has firstly an outer end connected to the locking element, namely, for example, the jaw 4, 5, and secondly an inner end provided with an axial guide stud 4B, 5B designed to co-operate functionally with the drive member 7.

Advantageously, the control member 7, and more precisely the intermediate plate 7A, is provided with at least one unlocking ramp 11A, 11B associated with each drive arm 4A, 4B.

Said at least one unlocking ramp 11A, 11B is arranged such that, when the control member 7 turns, under the action of the user, from its locking and decompression position to its unlocking and decompression position, the unlocking ramp 11A, 11B engages the axial stud 4B, 5B and pushes it towards the outside of the appliance, which causes the drive means 4A, 5A to move in radial translation from the locking position in which the lid is locked to the unlocking position in which the lid is unlocked.

Advantageously, the control member 7 is also provided with at least one locking ramp 12A, 12B associated with each drive arm 4A, 5A. Said at least one locking ramp 12A, 12B is arranged so that, when the control member 7 turns, under the action of the user, from its locking and decompression position, the locking ramp 12A, 12B engages the corresponding axial guide stud 4B, 5B, and pushes it horizontally towards the inside of the appliance, thereby causing the corresponding drive means 4A, 5A to move in radial translation from the unlocking position in which the lid is unlocked to the locking position in which the lid is locked.

Advantageously, each axial guide stud 4B, 5B is formed by a peg extending substantially in the axial direction, while the unlocking ramps 11A, 11B and the locking ramps 12A, 12B are obtained by providing a corresponding oblong orifice 14, 15 in the thickness of the plate 7A in a direction that slants relative to the radial direction, said oblong orifice 14, 15 being designed to receive the corresponding axial guide stud 4B, 5B.

It can thus be understood that the control member 7 makes it possible to act in positive and reversible manner to cause the locking/unlocking means 3 to go from their unlocking position to their locking position, and vice versa.

Advantageously, each locking ramp 12A, 12B is extended by position-holding means 13A, 13B for holding the corresponding axial stud 4B, 5B in position, said position-holding means 13A, 13B being arranged so that, when the control member 7 turns, under the action of the user, from its locking and decompression position to its substantially leaktight locking position, or from its substantially leaktight locking position to its locking and decompression position, the corresponding axial stud 4B, 5B and thus the corresponding drive means 4A, 5A are held substantially stationary in the locking position in which the lid is locked.

Preferably, said at least one position-holding means 13A, 13B can be in the form of a circular arc shaped orifice 16, 17 provided in the thickness of the plate 7A, and extending the corresponding oblong orifice 14, 15.

Each circular arc shaped orifice 16, 17 forming the position-holding means 13A, 13B has its geometrical center coinciding with the center of rotation of the control member 7, which center belongs to the general axis of symmetry X-X'.

Advantageously, the pressure-regulating valve 6 includes an activatable engagement member 6A which, when it is activated, makes it possible to place the pressure-regulating valve 6 in the leakage position, so that said valve has two functions since it thus forms activatable decompression means.

The activatable engagement means 6A can be in the form of a rod provided with a shoulder and extending in the axial direction, said shoulder forming an activation head.

Advantageously, the control member 7, and more particularly the intermediate plate 7A, is provided with a decompression ramp 18 designed to co-operate with the engagement means 6A so that, when the control member 7 turns, under the action of the user, from its substantially leaktight locking position to its locking and decompression position, the decompression ramp engages the engagement means 6A and pushes them axially upwards, thereby causing the pressure-regulating valve 6 to move from its leaktight position to its leakage position.

Advantageously, the decompression ramp 18 is extended by position-holding means 19 for holding the engagement means 6A in position, said position-holding means 19 being arranged so that, when-the control member 7 turns, under the action of the user, from its locking and decompression position to its unlocking and decompression position, or from the unlocking and decompression position to the locking and decompression position, the engagement means 6A are held in the activated position, which corresponds to the pressure-regulating valve 6 being held in the leakage position, i.e. the decompression means are activated.

Preferably, the position-holding means 19 for holding the engagement means 6A in position are constituted by a bearing surface which is substantially horizontal (i.e. extending at a constant height) and which serves to enable the head of the engagement means 6A to bear against it, said surface making it possible to hold the engagement means 6A at the maximum height that it has reached after being subjected to the action of the decompression ramp 18.

In addition, both the decompression ramp 18 and also the position-holding means 19 extend in the horizontal plane along a circular arc whose center coincides with the center of rotation of the intermediate plate 7A. This enables them to act in the axial direction only, on the engagement means 6A, without urging said engagement means in another direction, in particular a radial direction.

Preferably, the opening safety means, which are formed by a pressure-gauge rod 20, and the control member 7 are arranged relative to each other so that when the pressure-gauge rod is in the high position (blocking position), said pressure-gauge rod prevents any movement in rotation of the control member 7 from its locking and decompression position to its unlocking and decompression position.

Advantageously, the control member 7, and more particularly the plate 7A, is provided with a cooking fast start ramp 25 forming actuating means for actuating the safety means 20.

Said ramp 25 is arranged so that, when the control member 7 turns from its locking and decompression position to its substantially leaktight locking position, the cooking fast start ramp 25 engages the safety means 20 and drives them by pushing them from their neutral position (low position) to their blocking position (high position).

A more detailed description is given below of how the safety means 20 are mounted and of how they interact with the rotary intermediate plate 7A.

As shown in FIGS. 5, 7, 9, and 11, the pressure-gauge rod forming the safety means 20 is mounted in a well 31 extending axially and communicating in leaktight manner with the hole 21 provided in the lid.

At its bottom, the well 31 is provided with a sealing gasket 33 positioned facing the hole 21 so as to establish substantially leaktight communication between the inside of the bowl and the inside of the well 31.

The pressure-gauge rod 20 is elongate and extends axially between a top end and a bottom end. At its top end, the rod 20 has a top first main shoulder 34 whose bottom face serves to co-operate with the cooking fast start ramp 25.

The pressure-gauge rod 20 also has a second main shoulder 35 preferably provided substantially in the middle of the rod 20.

The bottom face of the second main shoulder 35 is provided for serving as a bearing surface relative to the gasket 33, so that the neutral position, in which the rod 20 rests on the bottom gasket 33, is of leaktight type.

The pressure-gauge rod is also provided with a third main shoulder formed at its bottom end. The top face of said third main shoulder is organized to come into abutment against and under the gasket 33, when the rod is in the blocking high position. In this way, the blocking position is of leaktight type.

The cooking fast start ramp 25 is formed integrally with a fin 30 secured to the plate 7A.

The fin 30 extends in substantially plane manner radially in the centrifugal direction. As can be seen, in particular, in FIGS. 3 and 4, the fin 30 is provided firstly with a margin 22 serving to come into abutment against the first main shoulder 34 when the rod is in the high position, and secondly with the cooking fast start ramp 25, which ramp extends substantially on a slant relative to the horizontal.

Operation of the cooking appliance of the invention is described below.

Firstly, the user places the food in the bowl 1, i.e. directly therein or indirectly via a removable basket contained in the bowl 1.

Figure 11:
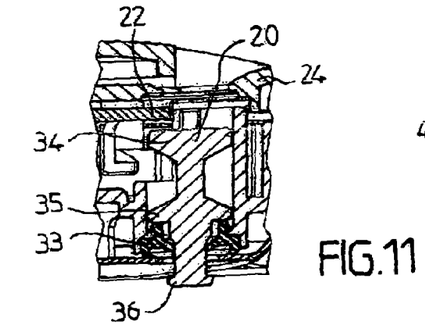
FIG. 11 is a fragmentary cross-section view of the detail of the embodiment shown in FIG. 9, when the user proceeds to unlock the lid.
Figure 12:
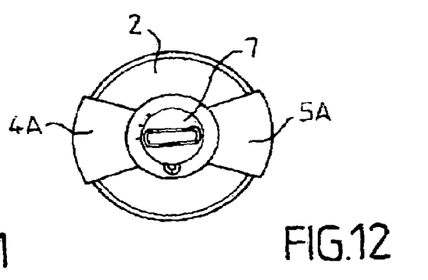
FIG. 12 is a plan view of the cooking appliance of the invention, a detail of which is shown in FIG. 11.

The user then mounts the lid 2 on the bowl 1, as shown in FIGS. 11 and 12. At this time, the control member 6 is in the unlocking and decompression position. This position of the control member 7 corresponds to an unlocking position in which the jaws 4, 5 are unlocked, with the decompression means being activated (i.e. the head 6A is resting on the horizontal bearing surface 19).

The safety rod 20 is in the neutral position.

The margin 22 overlies the rod 20 thereby preventing it from reaching its blocking position. This configuration also makes it possible to hold the rod 20 substantially in its leaktight neutral position, which is advantageous if the cooking appliance is used as a conventional stewpot, because the margin 22 prevents the rod 20 from moving upwards, thereby avoiding steam leaks to the outside.

The user then locks the lid 2 in leaktight manner onto the bowl 1, by turning the handle 7B clockwise over a first predetermined stroke, until the abutment position is reached that corresponds to the substantially leaktight locking position of the appliance. In going from its locking and decompression position to its leaktight locking position, the control member also goes through the locking and decompression position, but without stopping at it.

As the control member goes from the unlocking and decompression position to the substantially leaktight locking position, the cooking fast start ramp 25 raises the rod 20 and presses it into the blocking position.

Going from the unlocking and decompression position to the substantially leaktight locking position also makes it possible to deactivate the decompression means, i.e. the head 6A is then at the foot of the decompression ramp 18.

The cooking appliance can then be brought up to its operating pressure, which is regulated by the pressure-regulating valve 6, which, from then on, merely acts as decompression means.

The user can then at any time turn the handle 7B counterclockwise over a predetermined second stroke, which, via the decompression ramp 18, causes the head 6A to be raised and thus generates a steam leak causing the vessel to decompress.

However, the radial positions of the studs 4B, 5B do not vary while the control member is going from the substantially leaktight locking position to the locking and decompression position.

As shown in FIGS. 7 and 8, the pressure-gauge rod 20, which is, at this stage (in the locking and decompression position), no longer supported by the ramp 25, remains in the high position so long as the pressure prevailing inside the vessel significantly exceeds the descent pressure, which is, for example, equal to 2.5 kPa.

In the high position, the pressure-gauge rod 20 co-operates with the margin 22 in a manner such as to prevent the user from continuing to turn the handle 7B in the counterclockwise direction in order to unlock the lid 2 relative to the bowl 1.

Figure 9:
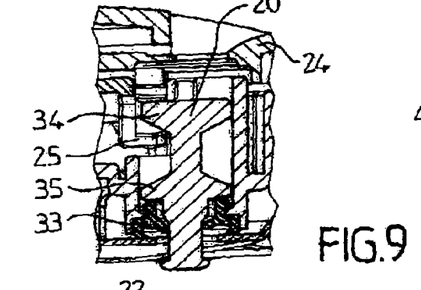
FIG. 9 is a fragmentary cross-section view of the detail of the embodiment shown in FIG. 7, once the decompression is complete.
Figure 10:
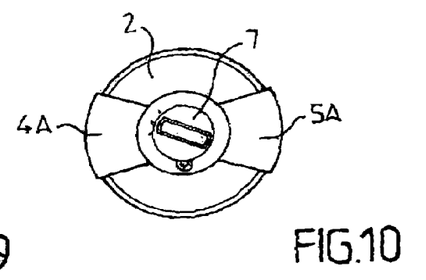
FIG. 10 is a plan view of the cooking appliance of the invention, a detail of which is shown in FIG. 9.

Then, once the pressure inside the vessel has reached or has fallen below the descent pressure, the pressure-gauge rod 20 returns automatically, under the effect of its weight, towards its neutral position (cf. FIGS. 9 and 10).

The user can thus, by imparting additional counterclockwise movement in rotation to the handle 7B, reach the unlocking and decompression position which enables the user to remove the lid from the bowl.

What is claimed is:

1. An appliance for cooking food under pressure, the appliance comprising:
   a bowl and a lid designed to be mounted on and locked onto said bowl to form a leaktight cooking vessel; and
   opening safety means suitable for going between a neutral position, in which they allow the lid to be unlocked, and a blocking position, in which they prevent the lid from being unlocked, said safety means being designed to find themselves in the blocking position when the pressure prevailing inside the vessel is greater than or equal to a predetermined value or "rise pressure", and/or when the temperature prevailing inside the vessel is greater than or equal to a predetermined value or "rise temperature";
   said appliance further comprising actuating means for actuating the safety means, which actuating means are arranged to make it possible to place the safety means in the blocking position regardless of the pressure level prevailing inside the cooking vessel.

2. An appliance according to claim 1, wherein the actuating means are arranged to co-operate by mechanical contact with the safety means.

3. An appliance according to claim 1, wherein the opening safety means are sensitive to the pressure prevailing inside the vessel.

4. An appliance according to claim 3, wherein the rise pressure lies substantially in the range 1.5 kPa to 4 kPa.

5. An appliance according to claim 4, wherein the rise pressure is substantially equal to 3 kPa.+−.0.5 kPa.

6. An appliance according to claim 3, wherein the safety means are designed to tend to go towards their neutral position when the pressure inside the vessel reaches a relative value or "descent pressure" lying substantially in the range 1.5 kPa to 4 kPa.

7. An appliance according to claim 6, wherein the descent pressure is substantially equal to 2.5 kPa.+−.0.5 kPa.

8. An appliance according to claim 3, wherein the safety means comprise a pressure-gauge rod mounted to move between a return low position forming a neutral position, and a high position forming a blocking position.

9. An appliance according to claim 1, further comprising locking/unlocking means suitable for going between a locking position in which the lid is locked relative to the bowl and an unlocking position.

10. An appliance according to claim 9, wherein the safety means are designed to interact with the locking/unlocking means so as to prevent the locking/unlocking means from going from their locking position to their unlocking position when said safety means are in the blocking position.

11. An appliance according to claim 1, further comprising activatable/deactivatable decompression means for decompressing the vessel, said decompression means being arranged to allow the pressure prevailing inside the vessel to drop when they are activated.

12. An appliance according to claim 9, wherein said decompression means co-operate so that, when the locking/unlocking means are in the locking position, the decompression means going from their activated position to their deactivated position drives the safety means into their blocking position.

13. An appliance according to claim 12, wherein said actuating means, said locking/unlocking means, and said decompression means co-operate so that when the locking/unlocking means are in the locking position and when the decompression means are activated, the actuating means allow the safety means to go towards their neutral position if the pressure inside the vessel so permits.

14. An appliance according to claim 1, wherein the safety means shut off in leaktight manner the communication between the vessel and the outside when they are in the neutral position.

15. An appliance according to claim 1, wherein the safety means shut off in leaktight manner the communication between the vessel and the outside when they are in the blocking position.

16. An appliance according to claim 1, further comprising locking/unlocking means suitable for going between a locking position in which the lid is locked relative to the bowl and an unlocking position, and further comprising activatable/deactivatable decompression means for decompressing the vessel, said decompression means being arranged to allow the pressure prevailing inside the vessel to drop when they are activated when said locking/unlocking means and said decompression means are connected functionally to a single, common control member, said control member being designed to be suitable for finding itself in a predetermined locking and decompression position in which said control member co-operates with the locking/unlocking means and with the decompression means so that the locking/unlocking means find themselves in their locking position, while the decompression means are activated.

17. An appliance according to claim 16, wherein the control member is designed to be suitable for finding itself in an unlocking an decompression position, in which said control member co-operates with the locking/unlocking means and with the decompression means so that the locking/unlocking means find themselves in their unlocking position, while the decompression means are activated.

18. An appliance according to claim 16, wherein the control member is designed to be suitable for finding itself in a substantially leaktight locking position, in which said control member co-operates with the locking/unlocking means and the decompression means so that the locking/unlocking means find themselves in their locking position, while the decompression means are deactivated.

19. An appliance according to claim 16, wherein the locking/unlocking means comprise at least one locking element for locking the lid relative to the bowl, said at least one element being mounted to move in radial translation relative to the lid, via corresponding drive means, between the locking position and the unlocking position.

20. An appliance according to claim 19, wherein the control member is mounted to move in rotation relative to the lid, and is connected functionally to the drive means so as to govern movement thereof.

21. An appliance according to claim 20, wherein the safety means and the control member are arranged relative the blocking position, prevent any movement in rotation of the control member from its locking and decompression position to its unlocking and decompression position.

22. An appliance according to claim 18, wherein the control member is provided with a cooking fast start ramp forming actuating means for actuating the safety means, said ramp being arranged so that, when the control member turns from its locking and decompression position to its substantially leaktight locking position, the cooking fast start ramp engages the safety means and drives them from their neutral position to their blocking position.

23. An appliance according to claim 1, that is constituted by a pressure cooker.

* * * * *